(12) United States Patent
Merkez et al.

(10) Patent No.: US 11,585,496 B2
(45) Date of Patent: Feb. 21, 2023

(54) LIGHTING SYSTEM FOR TUNNEL OR SIMILAR STRUCTURES

(71) Applicant: FS TUNNEL, Chevilly-Larue (FR)

(72) Inventors: Erik Merkez, Chevilly-Larue (FR); Marc Lassiaz, Chevilly-Larue (FR)

(73) Assignee: FS TUNNEL, Chevilly-Larue (FR)

( * ) Notice: Subject to any disclaimer, the term of this patent is extended or adjusted under 35 U.S.C. 154(b) by 0 days.

(21) Appl. No.: 17/324,939

(22) Filed: May 19, 2021

(65) Prior Publication Data

US 2021/0364137 A1    Nov. 25, 2021

(30) Foreign Application Priority Data

May 20, 2020 (FR) ...................... 2005325

(51) Int. Cl.
*F21S 4/22* (2016.01)
*F21S 2/00* (2016.01)
*F21V 15/01* (2006.01)
*F21V 23/00* (2015.01)
*F21V 23/04* (2006.01)
*F21V 23/06* (2006.01)
*F21Y 103/10* (2016.01)
*F21Y 105/10* (2016.01)
*F21Y 115/10* (2016.01)
*F21W 131/101* (2006.01)

(52) U.S. Cl.
CPC ................. *F21S 4/22* (2016.01); *F21S 2/005* (2013.01); *F21V 15/01* (2013.01); *F21V 23/005* (2013.01); *F21V 23/0471* (2013.01); *F21V 23/06* (2013.01); *F21W 2131/101* (2013.01); *F21Y 2103/10* (2016.08); *F21Y 2105/10* (2016.08); *F21Y 2115/10* (2016.08)

(58) Field of Classification Search
CPC .......... F21S 2/005; F21S 4/22; F21V 23/0471
See application file for complete search history.

(56) References Cited

U.S. PATENT DOCUMENTS

| | | | | |
|---|---|---|---|---|
| 5,559,681 A | * | 9/1996 | Duarte | F21V 21/08 362/231 |
| 8,262,250 B2 | * | 9/2012 | Li | F21V 23/06 362/219 |
| 8,714,764 B2 | * | 5/2014 | Yamashita | G02F 1/133609 362/97.3 |
| 2014/0043802 A1 | * | 2/2014 | Dings | F21V 23/0471 362/221 |
| 2014/0334142 A1 | | 11/2014 | Levante et al. | |

FOREIGN PATENT DOCUMENTS

EP    2894393 A2    7/2015

* cited by examiner

*Primary Examiner* — William N Harris
(74) *Attorney, Agent, or Firm* — Shumaker, Loop & Kendrick, LLP

(57) ABSTRACT

A lighting system for tunnels or similar works. The lighting system with LED diodes, including at least one lighting strip with LED diodes, with at least one set of LED diode modules, the modules of a set being divided up into subsets of one or more modules supplied with power by respective power supply buses, an electronic system supplying power to the strip, making it possible to power up, according to a first mode of operation, all the power supply buses and, in a second mode of operation, only a part of the power supply buses, so as to reduce the electrical consumption of the strip.

9 Claims, 2 Drawing Sheets

LIGHTING SYSTEM FOR TUNNEL OR SIMILAR STRUCTURES

TECHNICAL FIELD AND BACKGROUND

The present invention relates to a lighting system with LED diodes.

The use of lighting strips with LED diodes is expanding because of their light efficiency and ease of installation.

An LED diode strip typically comprises a flexible printed circuit bearing LED diodes, disposed inside a flexible jacket made of plastic material, transparent at least in the zone covering the LED diodes to allow the light to exit.

The LED diodes are arranged in identical modules which are repeated along the strip, all the modules being supplied with power by a common power supply bus with two electrical conductors, under the same power supply voltage. The power supply bus extends over the entire length of the strip, so as to allow the strips to be connected together one after the other.

Conventionally, the strip is supplied with power by a non-filtered double-alternating rectified voltage, from the mains, or, for the shorter strips, by a DC voltage such as 24 V DC.

The strips are generally installed in subways such as tunnels, but can also light parking lots, staircases, etc.

Backup battery operation is generally provided for mains outage cases.

The need to maintain emergency lighting for sufficient time generally imposes the use of high-capacity batteries, that are bulky and heavy.

Furthermore, in some situations, the lit zone is deserted, and would not need to be lit so intensely, which would make it possible to save energy.

SUMMARY

The invention aims to remedy these problems and its subject is a lighting system with LED diodes, comprising:
- at least one lighting strip with LED diodes, with at least one set of LED diode modules, the modules of a set being divided up into subsets of one or more modules supplied with power by respective power supply buses,
- an electronic system supplying power to the strip, making it possible to power up, according to a first mode of operation, all the power supply buses and, in a second mode of operation, only a part of the power supply buses so as to reduce the electrical consumption of the strip.

By virtue of the invention, it is possible to reduce the electrical consumption of the strip while producing light, which makes it possible to save on the capacity of the backup battery. Furthermore, in the other situations in which it is not necessary to supply maximal lighting, for example in the absence of personnel on the lit site, the electrical consumption can be reduced without in any way ceasing to light the site for security reasons.

The set of modules can comprise one module supplied with power by a respective power supply bus and at least one other module supplied with power by another power supply bus. Preferably, the set of modules comprises one module supplied with power by a respective power supply bus and all the other modules of the set are supplied with power by a same other power supply bus. That makes it possible to reduce the number of electrical conductors needed to supply power to the strip. For example, in reduced lighting, there is 1 module in every 2, 1 module in every 3, 1 module in every 4, even 1 module in every 6 or 1 in every 8, which remains on, depending on the result expected for the reduced or "emergency" lighting. Each set of modules can comprise between 2 and 20 modules, better between 2 and 10 modules, even better between 2 and 5 modules. The choice of the number of modules can be made notably as a function of the length of each module, so that, in the mode of operation with reduced lighting, the spacing between the modules supplied with power along the strip nevertheless produces sufficient lighting.

Each module comprises, for example, between 30 and 100 LED diodes. All the modules need not be identical to one another. For example, the module intended to be supplied with power permanently can comprise LED diodes supplied with an electrical power very much lower than their nominal power, for example more than two times lower, so as to prolong the life of the diodes given the permanence of the power supply. The modules can have different printed circuits, as necessary. Preferably, the lighting level is uniform between the modules in maximum lighting.

The modules of the same set are preferably disposed one after the other along the strip. The length of a module can usually lie between 25 and 100 cm. The modules can even correspond to rows of LED diodes extending along the strip. For example, the first module corresponds to a first row, and the other modules to the other rows. It is even possible to have an arrangement of the modules along the strip that is more complex, with, for example, printed circuits bearing several rows of LED diodes, the module that is on during the reduced lighting corresponding to only a part of the rows of only a part of the printed circuits.

The system can comprise at least one human presence sensor (via an infrared, radar or other detection), and the switch from the first mode of operation to the second and vice versa being made also according to whether or not a human presence is detected. For example, the system comprises an active RFID beacon sensitive to the proximity of an active RFID badge worn by the personnel of a site, and the change of mode can be made as a function of the distance at which the badges are detected. It is also possible to have simply a clock, which controls the switch to reduced lighting at certain times.

The strip can comprise a quick connector to at least three conductors, including a common conductor and at least two conductors specific to respective subsets of modules.

Another subject of the invention is a lighting strip for a system according to the invention, as defined above, comprising:
- a flexible jacket,
- at least one set of LED diode modules disposed inside the flexible jacket and being repeated for example along the latter, the modules of a set being divided up into subsets of one or more modules supplied with power by N respective power supply buses,
- a connector having at least N−1 poles, making it possible to supply power respectively to said buses.

Yet another subject of the invention is a method for lighting a work, notably a tunnel, in which a system according to the invention is used by supplying power simultaneously to all the modules from the mains to maximally light the work, and by supplying power only to a part of them in power outage cases or when there is a lesser need for light.

BRIEF DESCRIPTION OF THE DRAWINGS

Other features and advantages of the present invention will emerge on reading the following detailed description, of a nonlimiting exemplary embodiment thereof, and on studying the attached drawing, in which FIG. 1 schematically represents a lighting system according to the invention, FIG. 2 schematically represents in cross section the strip of FIG. 1.

DETAILED DESCRIPTION

Figure 1:
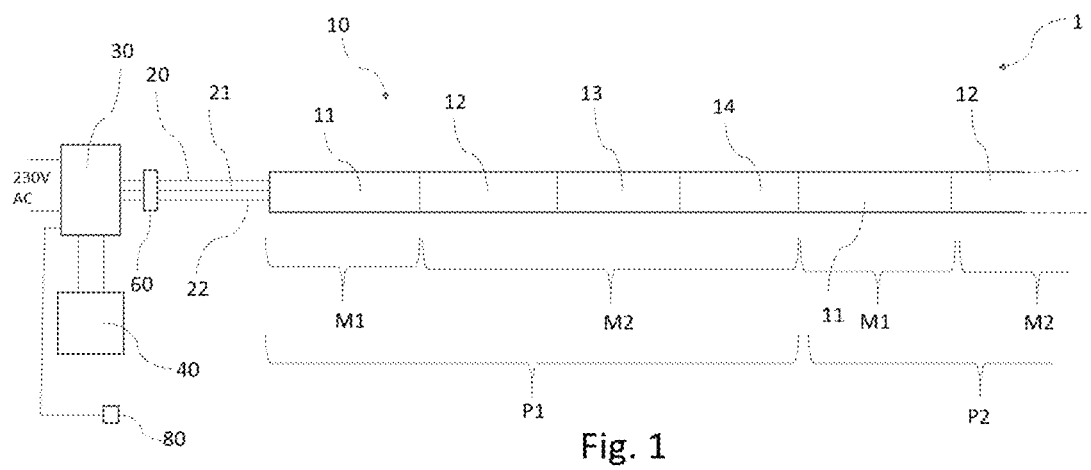

FIG. 1 shows a lighting system 1 according to the invention, comprising a strip 10 intended to light a tunnel for example.

Figure 2:
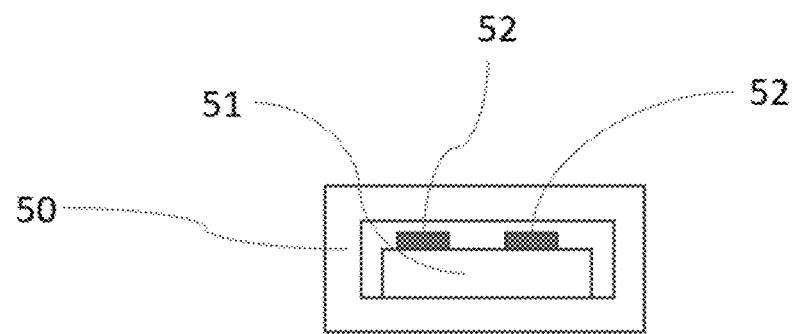

The strip 10 comprises, as can be seen in FIG. 2, a flexible jacket 50, for example made of silicone, inside which is disposed a flexible printed circuit 51 bearing LED diodes 52.

The LED diodes are arranged according to a succession of identical sets P1, P2, etc. Each set Pk of modules, with k an integer lying between 1 and the total number of sets of the strip, comprises at least two subsets of modules M1 and M2.

In the example considered, the subset M1 comprises a single module 11 and the subset M2 comprises three modules 12, 13 and 14.

All the modules 11 of the strip are supplied with power by the same power supply bus 20, 21. Thus, at the terminals of each of them, there is the same power supply voltage, for example approximately 200 V DC average voltage, when the voltage corresponds to the double alternation rectification of the 230 V AC mains, the invention not being limited to a particular power supply.

All the other modules are supplied with power by another power supply bus 20, 22, the conductor 20 being common to both buses. Thus, each of the modules 12, 13 and 14 receives the same power supply voltage, for example approximately 200 V DC average voltage.

The conductors 20, 21 and 22 are linked at one end by a plug connector 60 to an electronic power supply system 30 which is itself connected to the mains, for example 230 V AC as illustrated, but other mains voltages are possible, for example 110 V AC, or DC voltages such as 24 V DC.

The strip 10 can have the same type of connector, male or female, at the other end, so as to allow several strips to be connected together one after the other.

The electronic power supply system 30 is arranged to supply power respectively to one or more of the buses according to the mode of operation sought.

In the example considered, in a first mode of operation, corresponding to maximal lighting, the power supply buses 20, 21 on the one hand, and 20, 22 on the other hand, are supplied with power, for example under the same double-alternating rectified DC voltage.

The bus 20 is for example linked to the − and the buses 21 and 22 are linked to the +, at the output of a diode bridge used to produce the power supply DC voltage. All the modules 11 to 14 are on.

The second mode of operation corresponds to the supply of power by a backup electrical source 40, comprising, for example, an electric battery and an associated inverter, if necessary.

The switch to this second mode of operation takes place for example in network outage cases.

The power supply system 30 is arranged to supply power only to the bus 20, 21 in this second mode of operation, such that only the modules 11 are on along the strip.

The electrical consumption of the strip is then reduced, and the latter supplies minimal lighting.

The power supply system 30 comprises, for example, an electromechanical relay which is supplied with power by the 230 V AC mains and which, when supplied with power, ensures the connection of all the buses 20, 21 and 22 to the rectifier bridge. In network outage cases, this relay switches to an idle state in which it ensures the connection of only the bus 20, 21 to the backup source 40.

The power supply system 30 can then switch, in one exemplary implementation of the invention, to a mode of operation in which only the bus 20, 21 is supplied with power, but by the mains instead of the backup source.

The switch to this mode of operation takes place for example in certain circumstances in which the mains is present but in which the need for lighting is lower, for example because of the absence of personnel on the site lit by the strip.

The power supply system 30 can receive a control signal from a detector 80 which is sensitive to the presence of people within a given perimeter; if no person is detected, the system switches to reduced lighting; in case of human presence, it switches back to normal lighting mode.

Figure 3:
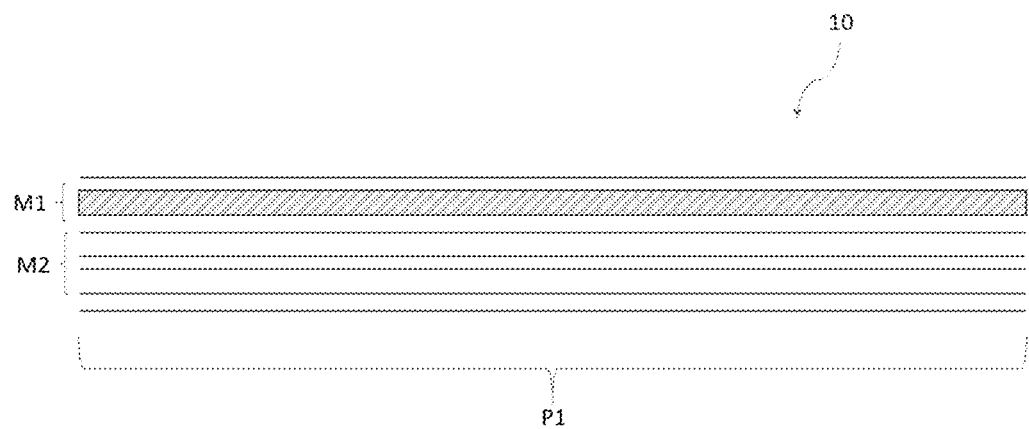
FIG. 3 illustrates a strip in which the modules correspond to respective rows of LED diodes.

The dispositions of the modules on the strip can be different, and each module can correspond, for example, to a row of LED diodes, all the rows extending in parallel along the strip, as illustrated in FIG. 3.

In this figure, the strip comprises a subset M1 of modules corresponding to a row of LED diodes extending over the entire length of the strip, the rest of the LED diodes forming a second subset M2 of modules. In reduced lighting, only the row corresponding to the subset M1 is on. When the lighting is maximal, all the rows are supplied with power.

Figure 4:
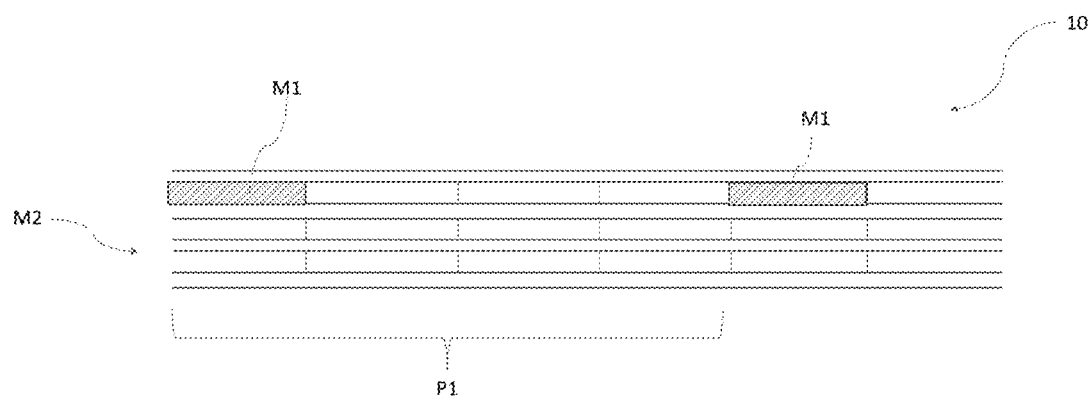
FIG. 4 illustrates a strip in which the modules that are on in reduced lighting correspond to only certain rows of modules belonging to sets of modules which are repeated along the strip.

It is even possible to have, as illustrated in FIG. 4, a disposition of the LED diodes in the form of several rows, three for example, belonging to sets P1, P2, etc., which are repeated along the strip, the grouping of the LED diodes within the strip in the form of subsets of modules controlled by respective power supply buses being such that, in reduced lighting, only a part of the rows is on, and only over a part of the length of each set. In the example illustrated in FIG. 4, only the subset M1 within the sets P1, P2, etc. of modules which are repeated along the strip is on in reduced lighting.

The number of modules within a set Pk of modules can also be different, as can the number of modules in each subset, the number of subsets, and the number of sets.

The invention claimed is:

1. A lighting system with LEDs, comprising:
at least one strip of lighting with LEDs, with at least one set of LED modules, the modules of a set being divided up into subsets of one or more modules supplied with power by respective power supply buses, wherein the strip comprises a quick connector to at least three conductors, including a common conductor and at least two conductors specific to respective subsets of modules, an electronic system for supplying power to the strip making it possible to power up, according to a first mode of operation, all the power supply buses and, in a second mode of operation, only a part of the power supply buses, so as to reduce the electrical consumption of the strip, the common conductor being linked to one pole of the electronic system for supplying power and the other conductors being, in said first mode of operation, all linked to the other pole of the electronic system for supplying power, at an output of a diode bridge, and the electronic system for supplying power being supplied with AC double-alternating rectified voltage.

2. The system as claimed in claim 1, wherein each set of modules comprises a module supplied with power by a respective power supply bus and at least one other module supplied with power by another power supply bus.

3. The system as claimed in claim 2, wherein the set of modules comprises one module supplied with power by a respective power supply bus and all the other modules of the set being supplied with power by one and the same other power supply bus.

4. The system as claimed in claim 2, wherein each set of modules comprises between 2 and 20 modules.

5. The system as claimed in claim 1, wherein each module comprises between 30 and 100 LEDs.

6. The system as claimed in claim 2, wherein the modules of a same set are disposed one after the other along the strip.

7. The system as claimed in claim 1, further comprising at least one human presence sensor, and a switch from the first mode of operation to the second and vice versa being made also according to whether or not a human presence is detected.

8. A lighting strip for the system as defined in claim 1, comprising:

a flexible jacket, at least one set of LEDs disposed inside the flexible jacket, being repeated along the latter, the modules of a set being divided up into subsets of one or more modules supplied with power by N respective power supply buses, a connector having at least N−1 poles, making it possible to selectively power said buses.

9. A method for lighting a work in which the system as claimed in claim 1 is used, by simultaneously supplying power to all the modules from a mains to maximally light the work, and by supplying power to only a part of them in the case of a mains outage or when there is a lesser need for light.

* * * * *